United States Patent
Huisinga et al.

(10) Patent No.: US 9,717,268 B2
(45) Date of Patent: *Aug. 1, 2017

(54) METHOD OF PRODUCING CELLULOSE ENCASED SAUSAGES

(75) Inventors: Benjamin P. Huisinga, Haverhill, IA (US); Jos J. Kobussen, Indianola, IA (US); Robert W. Damstetter, Ankeny, IA (US)

(73) Assignee: STORK TOWNSEND INC., Des Moines, IA (US)

( * ) Notice: Subject to any disclaimer, the term of this patent is extended or adjusted under 35 U.S.C. 154(b) by 1158 days.

This patent is subject to a terminal disclaimer.

(21) Appl. No.: 12/713,380

(22) Filed: Feb. 26, 2010

(65) Prior Publication Data

US 2011/0097461 A1    Apr. 28, 2011

Related U.S. Application Data

(60) Provisional application No. 61/254,784, filed on Oct. 26, 2009.

(51) Int. Cl.
| | | |
|---|---|---|
| *A23L 13/60* | (2016.01) | |
| *A23P 20/20* | (2016.01) | |
| *A23B 4/005* | (2006.01) | |
| *A22C 11/00* | (2006.01) | |

(52) U.S. Cl.
CPC .............. *A23L 13/65* (2016.08); *A23P 20/20* (2016.08); *A22C 11/003* (2013.01); *A23B 4/0056* (2013.01)

(58) Field of Classification Search
CPC .......... A23L 13/65; A23P 20/20; A23P 30/25; A22C 11/003; A23B 4/0056; A23B 4/044

USPC ....... 426/389, 412, 105, 138, 140, 129, 135, 426/410, 415; 428/34.8; 452/50, 21, 22, 452/30, 35

See application file for complete search history.

(56) References Cited

U.S. PATENT DOCUMENTS

| | | | | |
|---|---|---|---|---|
| 1,631,723 | A | * | 6/1927 | Freund .......................... 426/315 |
| 2,136,106 | A | * | 11/1938 | Kern ............................. 426/105 |
| 2,301,564 | A | * | 11/1942 | Menges ........................ 426/135 |
| 2,312,339 | A | * | 3/1943 | Jones ............................. 99/331 |
| 2,328,751 | A | * | 9/1943 | Snyder et al. ................ 426/412 |
| 2,630,598 | A | * | 3/1953 | Grey ............................... 452/50 |
| 2,685,518 | A | | 8/1954 | Prohaska |
| 2,767,097 | A | * | 10/1956 | Schneider ..................... 426/105 |
| 2,839,780 | A | * | 6/1958 | Demarest et al. ............. 452/50 |
| 3,113,870 | A | * | 12/1963 | Barnett et al. ............... 426/315 |
| 3,121,638 | A | * | 2/1964 | Olson et al. ................. 426/265 |
| 3,190,759 | A | * | 6/1965 | Muller et al. ................ 426/412 |

(Continued)

FOREIGN PATENT DOCUMENTS

| | | |
|---|---|---|
| GB | 1187635 | 4/1970 |
| GB | 2176990 | 1/1987 |

(Continued)

OTHER PUBLICATIONS

Pearson, A.M. "Processed Meats" Third Edition, 1996. pp. 96-101.*

(Continued)

*Primary Examiner* — Viren Thakur
(74) *Attorney, Agent, or Firm* — Zarley Law Firm, P.L.C.

(57) ABSTRACT

A method of producing cellulose encased sausages where an encased sausage is partially cooked, the partially cooked sausage is hot peeled, and the cooking of the peeled sausage is finished in its packaging.

17 Claims, 1 Drawing Sheet

(56) References Cited

U.S. PATENT DOCUMENTS

| | | | |
|---|---|---|---|
| 3,390,422 A * | 7/1968 | Doyle | 452/50 |
| 3,589,915 A * | 6/1971 | Lustig | 426/105 |
| 3,903,313 A * | 9/1975 | Maher et al. | 426/250 |
| 4,138,767 A * | 2/1979 | Stiles | 452/50 |
| 4,171,381 A * | 10/1979 | Chiu | 426/105 |
| 4,222,150 A * | 9/1980 | Andersen | 452/50 |
| 5,053,239 A * | 10/1991 | Vanhatalo et al. | 426/412 |
| 5,094,649 A | 3/1992 | Hall et al. | |
| 5,141,762 A * | 8/1992 | Mally | 426/412 |
| 5,246,395 A * | 9/1993 | Zirps et al. | 452/50 |
| 5,551,334 A | 9/1996 | Cody | |
| 5,649,858 A * | 7/1997 | Williams et al. | 452/50 |
| 5,914,141 A | 6/1999 | Stall et al. | |
| 6,132,779 A * | 10/2000 | Lacoste-Bourgeacq et al. | 426/57 |
| 6,989,170 B2 * | 1/2006 | Konanayakam et al. | 426/243 |
| 2003/0207002 A1* | 11/2003 | Merritt et al. | 426/262 |
| 2008/0145495 A1* | 6/2008 | Burroughs et al. | 426/277 |

FOREIGN PATENT DOCUMENTS

| | | |
|---|---|---|
| GB | 2248010 A | 3/1992 |
| NL | 1014685 | 7/2001 |
| WO | 2007032678 A1 | 3/2007 |

OTHER PUBLICATIONS

"Cooking Most Smoked Meats" Nov. 1994.*

Masana et al: "Foot-and-mouth disease virus inactivation in beef frankfurters using a biphasic cooking system", Food Microbiology, Academic Press Ltd, London, GB, vol. 12, Feb. 1, 1995, pp. 373-380, XP005078916, ISSN: 0740-0020, DOI: DOI: 10.1016/S0740-0020(95)80118-9 p. 374, right-hand column-p. 375, left-hand column; tables 1,2.

Pearson A.M. and Tauber F.W.: "Processed meats", 1985, AVI, Westport, XP002628378, pp. 192-201, the whole document.

* cited by examiner

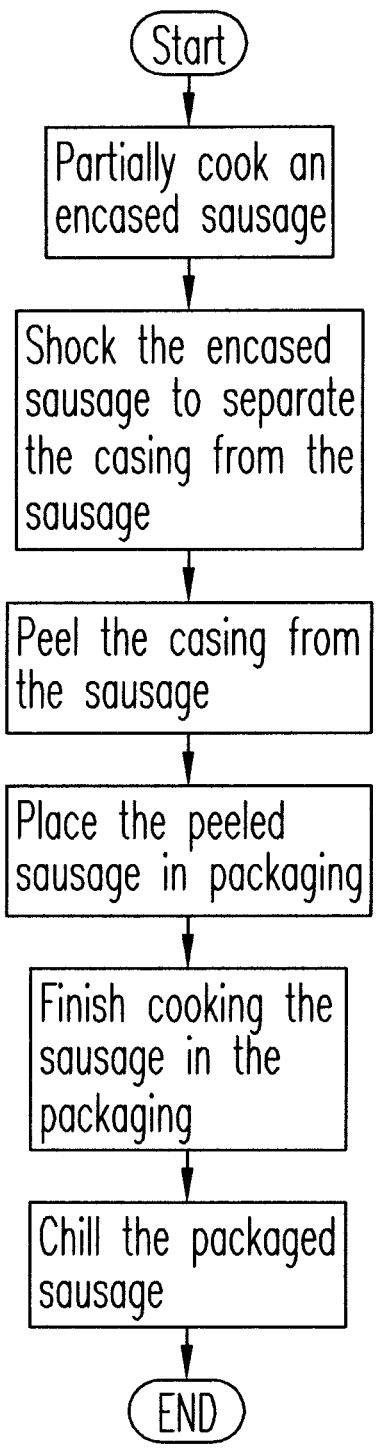

METHOD OF PRODUCING CELLULOSE ENCASED SAUSAGES

CROSS REFERENCE TO RELATED APPLICATION

This application claims the benefit of U.S. Provisional Application No. 61/254,784 filed Oct. 26, 2009.

BACKGROUND OF THE INVENTION

This invention is directed toward a method of producing cellulose encased sausages, and more particularly a method of producing food safe cellulose encased sausages.

Presently, cellulose encased sausages (i.e., hot dogs and the like) are exposed to the environment after cooking and before packaging. As a result, sausages are potentially exposed to pathogen contaminants such as Listeria or Salmonella. When consumed, pathogen infected food products can cause serious illness or even death. Present production methods attempt to minimize this risk, but are not foolproof.

Thus, to guarantee a food-safe product, post packaging treatments such as high pressure pasteurization, post heat pasteurization, and irradiation are used. While these treatments produce a food-safe product, they also degrade the quality of the product, are complex to use, and/or are costly. Therefore, a need exists in the art for a method that produces a safe cellulose encased sausage, while maintaining a high quality product, reducing production costs, and being easy to perform.

An objective of the present invention is to provide a method of producing a safe cellulose encased sausage that maintains high product quality.

Another objective of the present invention is to provide a method of producing a safe cellulose encased sausage that reduces production costs.

A still further objective of this invention is to provide a method of producing a safe cellulose encased sausage where the method is easy to perform.

These and other objectives will be apparent to one skilled in the art based upon the following disclosure

SUMMARY OF THE INVENTION

A method of producing cellulose encased sausages including partially cooking an encased sausage, hot peeling the encased sausage, and finishing the cooking of the sausage inside the final packaging. The critical control points such as the high temperature for lethality and the low chill temperature are monitored and controlled by a controller.

BRIEF DESCRIPTION OF THE DRAWING

FIG. 1 is a flow diagram of a method of producing cellulose encased sausages.

DETAILED DESCRIPTION OF THE PREFERRED EMBODIMENTS

Generally, the method involves the development of a cooking process where the casing of the sausage is hot peeled in an undercooked state and then fully cooking and chilling the product within the packaging.

Initially, through a conventional process, a cellulose casing is filled, linked, hung, and transported to an oven. Next, the encased sausages are heated (or partially cooked) to preferably an internal temperature of between 125° F. to 145° F. so that enough of the sausage proteins are coagulated to make the sausages sufficiently rigid to withstand the remaining production process. The cooking time for this step is based upon the oven temperature and the diameter and composition of the sausage. Preferably, in one example, the sausages are exposed to a natural smoke or liquid smoke shower and then exposed to a first cooking zone having a 140° F. dry bulb and a 100° F. wet bulb for a desired period of time. Optionally, the sausages are then exposed to a second natural smoke or liquid smoke shower before entering a second cooking zone. The second cooking zone preferably has a 158° F. dry bulb and a 130° F. wet bulb.

Once the sausages reach a desired internal temperature, the encased sausage is shocked so that the casing is loosened from the sausages. Shocking occurs by exposing the encased sausages to an environment having a different temperature such as for example using hot water, cold water, or steam.

Once shocked, the encased sausages are introduced to a peeler where the casing is removed from the undercooked sausages. This is different from the conventional process where an encased sausage is fully cooked prior to peeling. The process of undercooking, shocking and peeling is defined as hot peeling. Preferably, hot peeling occurs when the encased sausages are peeled at a temperature where the sausages are in an undercooked state, but not chilled (approximately between 100° F. and 140° F.). Once peeled the sausages are auto loaded using a loader into a packaging machine and vacuum packed.

After the sausages have been vacuum packed, the packages are cooked to lethality preferably in hot water. The cooking can be continuous or intermittent. Intermittent cooking is particularly beneficial for double stacked products to avoid over cooking of the outside of the product. Once the packaged sausages are cooked, the products are chilled, preferably in cold water to 40° F. or less.

Throughout the production process the cooking and chilling temperatures are electronically monitored by a controller. This monitoring insures that critical control points (i.e., high temperature lethality and low chill temperature) are always met. Also, this monitoring allows feedback for automatic adjustments to the system can be made.

This method provides several benefits. First, the process eliminates microbial contamination. Second, the quality of the product is not compromised as, for example, it is not recooked through post pasteurization as the cooking of the sausages are completed in the packaging. Third, the process is much more simple, easy to perform, and less costly particularly as compared to irradiation and high pressure processing. The method also increases capacity, improves yield, eliminates the need for anti-microbial additives, improved shelf life, improved compliance with HACCP standards, and uses less energy.

We claim:
1. A method of producing sausages, comprising the steps of:
   partially cooking an encased sausage to a temperature between 125° F. and 145° F.;
   hot peeling the casing from the partially cooked sausage wherein the sausage is at a temperature of between 100° F. and 140° F.;
   packaging the peeled sausage; and
   finishing the cooking of the peeled sausage inside the packaging with intermittent cooking;
   wherein the peeled sausages are vacuum packed into the packaging prior to cooking.

2. The method of claim 1 further comprising the step of monitoring critical control temperature points with a controller.

3. The method of claim 1 wherein the step of hot peeling the casing from the sausage is performed by introducing the sausage to a peeler.

4. The method of claim 2 further comprising automatically adjusting the temperature to insure that heating, cooking, and chilling temperatures are always met.

5. The method of claim 1 wherein the time for partially cooking the encased sausage depends upon an oven temperature and a diameter of the encased sausage.

6. The method of claim 1 wherein the encased sausage is partially cooked in two cooking zones.

7. The method of claim 6 wherein one of the cooking zones includes a 140° F. dry bulb and a 100° wet bulb.

8. The method of claim 6 wherein one of the cooking zones include a 158° F. dry bulb and a 130° F. wet bulb.

9. A method of producing sausages, comprising the steps of:
   heating an encased sausage to a temperature between 125° F. and 145° F. to coagulate the proteins in the sausage to make the sausage sufficiently rigid to withstand a peeling process such that the sausage is partially cooked;
   shocking the sausage so that the casing loosens from the sausage;
   introducing the sausage into a peeler and removing the casing from the sausage when the encased, partially cooked sausages are at a temperature of between 100° F. and 140° F. during peeling;
   packaging the sausage; and
   cooking the packaged peeled sausage to microbial lethality with intermittent cooking.

10. The method of claim 9, further comprising the step of chilling the packaged sausage after cooking.

11. The method of claim 9 wherein heating and cooking temperatures are monitored by a controller.

12. The method of claim 10 wherein heating, cooking, and chilling temperatures are monitored by a controller.

13. The method of claim 9 wherein the step of shocking the sausage comprises exposing the sausage to an environment having a different temperature than the sausage.

14. The method of claim 13 wherein the environment comprises steam.

15. The method of claim 9 wherein the peeled sausages are vacuum packed into the packaging prior to cooking.

16. The method of claim 9 wherein the sausage is shocked with the use of steam.

17. The method of claim 11 further comprising automatically adjusting the temperature to insure that heating, cooking, and chilling temperatures are always met.

* * * * *